(12) United States Patent
Lemiläinen et al.

(10) Patent No.: US 6,681,259 B1
(45) Date of Patent: Jan. 20, 2004

(54) METHOD FOR COUPLING A WIRELESS TERMINAL TO A DATA TRANSMISSION NETWORK AND A WIRELESS TERMINAL

(75) Inventors: Jussi Lemiläinen, Tampere (FI); Henry Haverinen, Tampere (FI)

(73) Assignee: Nokia Mobile Phones Ltd, Espoo (FI)

( * ) Notice: Subject to any disclaimer, the term of this patent is extended or adjusted under 35 U.S.C. 154(b) by 0 days.

(21) Appl. No.: 09/307,894

(22) Filed: May 10, 1999

(30) Foreign Application Priority Data

May 12, 1998 (FI) ................................................. 981052

(51) Int. Cl.⁷ .............................................. G06F 15/16
(52) U.S. Cl. ....................................... 709/250; 709/227
(58) Field of Search ................................. 709/250, 225, 709/227, 220, 238, 222, 239, 317; 710/8; 370/216; 340/7.1; 455/403; 713/201

(56) References Cited

U.S. PATENT DOCUMENTS

| | | | | |
|---|---|---|---|---|
| 5,263,178 A | | 11/1993 | Liukkonen | 455/76 |
| 5,353,328 A | | 10/1994 | Jokimies | 379/58 |
| 5,392,282 A | | 2/1995 | Kiema | 370/77 |
| 5,490,235 A | | 2/1996 | Von Holten et al. | 395/2.79 |
| 5,557,748 A | * | 9/1996 | Norris | 709/220 |
| 5,630,061 A | * | 5/1997 | Richter et al. | 709/227 |
| 5,714,943 A | * | 2/1998 | Rasor | 340/7.1 |
| 5,802,351 A | | 9/1998 | Frampton | 395/500 |
| 5,852,721 A | * | 12/1998 | Dillon et al. | 709/227 |
| 5,862,344 A | * | 1/1999 | Hart | 709/238 |
| 5,890,005 A | | 3/1999 | Lindholm | 395/750.03 |
| 5,918,018 A | * | 6/1999 | Gooderum et al. | 709/225 |
| 5,983,090 A | * | 11/1999 | Aoki | 455/403 |
| 6,003,097 A | * | 12/1999 | Richman et al. | 710/8 |
| 6,131,163 A | * | 10/2000 | Wiegel | 713/201 |
| 6,134,587 A | * | 10/2000 | Okanoue | 709/222 |
| 6,151,297 A | * | 11/2000 | Congdon et al. | 370/216 |
| 6,289,377 B1 | * | 9/2001 | Lalwaney et al. | 709/222 |
| 6,330,597 B2 | * | 12/2001 | Collin et al. | 709/220 |
| 6,484,210 B1 | * | 11/2002 | Adriano et al. | 709/239 |

OTHER PUBLICATIONS

Tripunitara et al, A Middleware Approach to Asynchronous & Backward Compatible Detction & Prevention of ARP Cache Poisoning, IEEE 1999.*

* cited by examiner

Primary Examiner—Mark R. Powell
Assistant Examiner—Thong Vu
(74) Attorney, Agent, or Firm—Perman & Green, LLP (57) ABSTRACT

The invention relates to a terminal (A), which comprises at least one network interface card (NIC1, NIC2, NIC3) for setting up a data transmission connection to a communication network (NW1, NW2, NW3, MNW) for packet switched data transmission, and means (PD) for forming packets of the information to be transmitted and for unpacking information from the received packets. The terminal (A) is allocated at least one first address identifying the terminal (A), and at least one data network-specific second address. The means (PD) for forming packets comprise means for connecting the first address to the packets, and the terminal (A) also comprises a network interface selection driver (NISD), which contains means for selecting the communication network (NW1, NW2, NW3, MNW) used in data transmission at a given time, means for transmitting packets between the means (PD) for forming packets and the network interface card (NIC1, NIC2, NIC3) corresponding to the data transmission network (NW1, NW2, NW3, MNW) used at a given time, and means for modifying the first address to the second address according to the data transmission network used in the packets at a given time.

12 Claims, 10 Drawing Sheets

METHOD FOR COUPLING A WIRELESS TERMINAL TO A DATA TRANSMISSION NETWORK AND A WIRELESS TERMINAL

BACKGROUND OF THE INVENTION

The present invention relates to a wireless terminal according to the preamble of the appended claim 1, and to a method according to the appended claim 8, for coupling a wireless terminal to a data transmission network.

Considerable growth in the use of computers has increased the need for establishing data transmission networks, to which these computers are coupled. Especially in office use, a local area network, such as the so-called Ethernet data network, is used as a data transmission network, to which office computers, printers and other corresponding devices are connected. Thus, it is possible to use other resources connected to the local area network from the computer, for example for printing, wherein it is not necessary to provide each computer with such peripheral devices. The computer connected to the local area network contains a network interface card, or the like, which comprises means necessary for establishing a data transmission connection between the computer and the local area network. Inter-office local area networks are typically implemented by means of a landline, for example by using a so-called thin Ethernet cabling. With the thin Ethernet cabling it is possible to achieve a speed of 10 Mb/s, but for example with twin cabling, it is possible to use transmission speeds of even 100 Mb/s.

It is also possible to implement the local area network as a wireless local area network WLAN. These wireless local area networks are typically based on the use of radio modems, wherein the office can be included in the range of the local area network with one or more such radio modems. The computer is equipped with a network interface card, which comprises, for instance, a radio transceiver for setting up a connection to a radio modem in the local area network. In such a wireless local area network, the placement of the computers is consirerably freer compared to a fixed landline local area network. Such landline local area networks intended for office use use in a relatively large bandwidth, wherein it is possible to achieve data transmission rates as high as 2 Mb/s. In particular, it is easy to connect portable computers to such a wireless local area network.

In addition to the above presented local area network solutions, the global Internet data network is known, which has recently grown very rapidly in popularity. The aforementioned local area networks can constitute a part of such Internet data network, wherein a data transmission connection to the Internet data network is set up from the local area network LAN, WLAN. Such a data transmission connection can be, for example, a modem connection from the server computer of the local area network to the server computer of Internet operator, or the server computer of the local area network can be coupled to form a part of the Internet data network.

Figure 1:
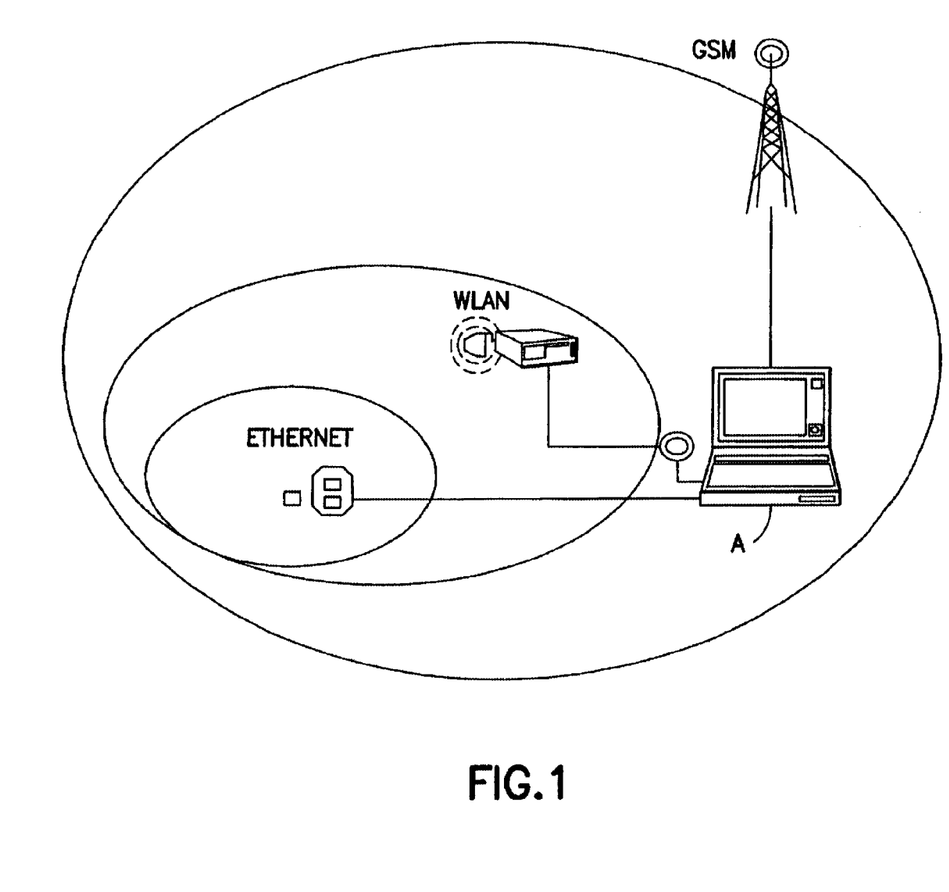
FIG. 1 shows in a reduced skeleton diagram some network types, in which the invention can be advantageously applied.

In connection with portable computers, so-called PCM-CIA cards have been developed, which contain built-in mobile station features, such as a GSM mobile station and peripheral circuits required for data transmission. Thus, it is possible to set up a data call from such a wireless data processor via the GSM mobile communication network to another data processor or even to a local area network of an office. Previously, a restriction in such data transmission utilizing the GSM mobile communication network has been the relatively low data transmission rate of 9600 bits/s, but solutions capable of faster data transmission are under development, such as HSCSD (High Speed Circuit Switched Data) and GPRS (General Packet Radio Service). The appended FIG. 1 presents in a reduced skeleton diagram the aforementioned different network types.

As portable computers are becoming smaller in size and their features are increasing, it has become more and more popular to use them also in offices. A portable computer, provided with a network interface card intended for use in a wireless local area network, can be used as a wireless terminal in connection with the wireless local area network WLAN. The local area network of an office can consist of both a landline local area network LAN and a wireless local area network WLAN. For example, upon enlargement of the office, a fixed interconnection is not necessarily made for the local area network, but the extension of the local area network is implemented with such a wireless local area network solution in the office. In the office, the terminal could thus primarily use the landline local area network, wherein a network interface card for the landline local area network is connected to the portable computer. To make better mobility possible, a network interface card for the wireless local area network is changed in the portable computer. At this stage, however, the user of the terminal has to terminate the network connections in use at that moment and change the network interface card, after which the connection to the local area network can be set up again. In some situations, it might be necessary to use the terminal outside the office and be connected to the local area network of the office. Thus, when using methods and local area networks currently known, it is possible to change the network interface card in the portable computer whereby the connection can be set up via a mobile communication network. Also in this situation it is not possible to change the connection by using methods and terminals of prior art without terminating the active connections.

Furthermore, a problem in the different communication networks presented above is, for instance, that in each communication network, a different terminal identification is used. Differences in the terminal identification used by different data transmission networks do not necessarily cause inconveniences for the user of the terminal, because s/he is always aware of which network s/he is using. Nevertheless, when an attempt is made to set up a connection to this terminal, the person who sets up the connection to the terminal has to know the location in the communication network to which the terminal in question is connected at a given time. One such connection set-up situation is when an attempt is made to set up a call via the Internet data network. Another drawback is that the user of such different data transmission networks has to monitor the quality of the connection. For example, when the user moves inside the office and uses the wireless local area network WLAN, in some parts of the office the quality of the connection may become so poor that data transmission is disturbed or delayed significantly. Thus, the user should try to shift to such a data transmission network, in which a better connection quality is achieved, for example to a landline local area network LAN, if such is in the vicinity, or to the GSM mobile communication network, if the user is in its coverage area. This change of the data transmission network causes the problems described above: termination of the existing connections, setting up new connections and, if necessary, also cutting off or setting up a telephone connection.

SUMMARY OF THE INVENTION

It is a purpose of the present invention to provide a method for coupling a portable terminal in a flexible manner to a data transmission network, and for changing the data transmission connection used at a given time to another data transmission network when necessary, as well as to a portable terminal according to the method. A wireless terminal according to the present invention is characterized in what will be presented in the characterizing part of the appended claim 1. A method according to the present invention is characterized in what will be presented in the characterizing part of the appended claim 8. The invention is based on the idea that the network layer address (IP address) of the terminal and the link layer addresses used by the different network interface solutions available in the terminal are combined in the terminal.

With the present invention, significant advantages are achieved, compared to methods and terminals of prior art. The embodiment according to the invention makes it possible to supplement the operating system used in the terminal with the functionality of a mobile terminal, without a need to make changes in the operational modules of the operating system or in the network interface software. Thus, such a multi-mode terminal can be used in several local area networks of different types and in other communication networks, and even in such a way that the communication network used at a given time can be changed without terminating active connections. This transition can be arranged to be conducted in such a way that the user does not even notice the transition. Thus, it is possible to use one network layer address in the terminal, wherein it is not necessary for the applications used in the terminal to know which physical data transmission network is used at a given time. This invention also makes it possible to use of all the data transmission networks available at a time, the data transmission network, in which the best possible connection quality is achieved. In addition, when the quality of the connection possibly becomes poor, the data transmission network can be changed to another data transmission network, in which a better connection quality is possibly achieved at that moment. Also, the user of the terminal according to the invention can always be communicated without the initiator of the communication having to know to which data transmission network the terminal is coupled at a given time.

BRIEF DESCRIPTION OF THE DRAWING

In the following, the invention will be described in more detail with reference to the appended figures, in which.

DETAILED DESCRIPTION OF THE INVENTION

Figure 2:
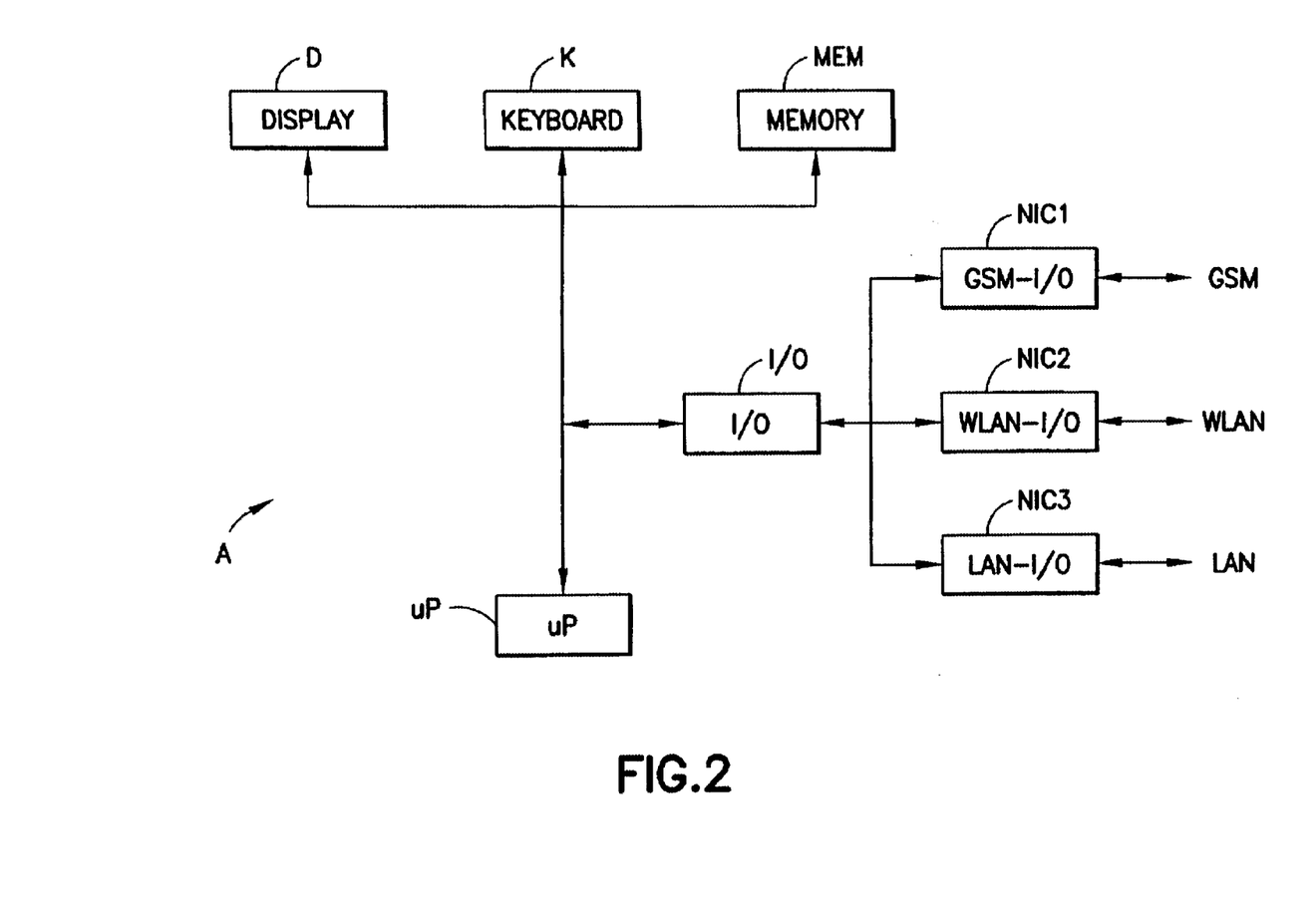
FIG. 2 shows a terminal according to an advantageous embodiment of the invention in a reduced block diagram.

In the following, the invention will be described by using as an example of the mobile terminal a portable computer, which is presented in a reduced block diagram in FIG. 2. The operating system in the computer is the Windows® NT operating system developed by Microsoft Corporation, but it is obvious that the invention can be applied also in connection with other operating systems. Furthermore, in a terminal A there are several network interface adapters NIC1, NIC2, NIC3 available for coupling to data transmission networks of different types, of which an Ethernet type landline local area network, a wireless local area network WLAN according to the IEEE standard 802.11, and a GSM mobile communication network are mentioned as examples, but also other data transmission solutions, such as the packet switched data transmission system GPRS (General Packet Radio Service) of the GSM system and LPRF (Low Power RF) based on a low power radio signalling, can be applied in connection with the present invention. Such terminal A is also called a multi-mode terminal.

Figure 3A:
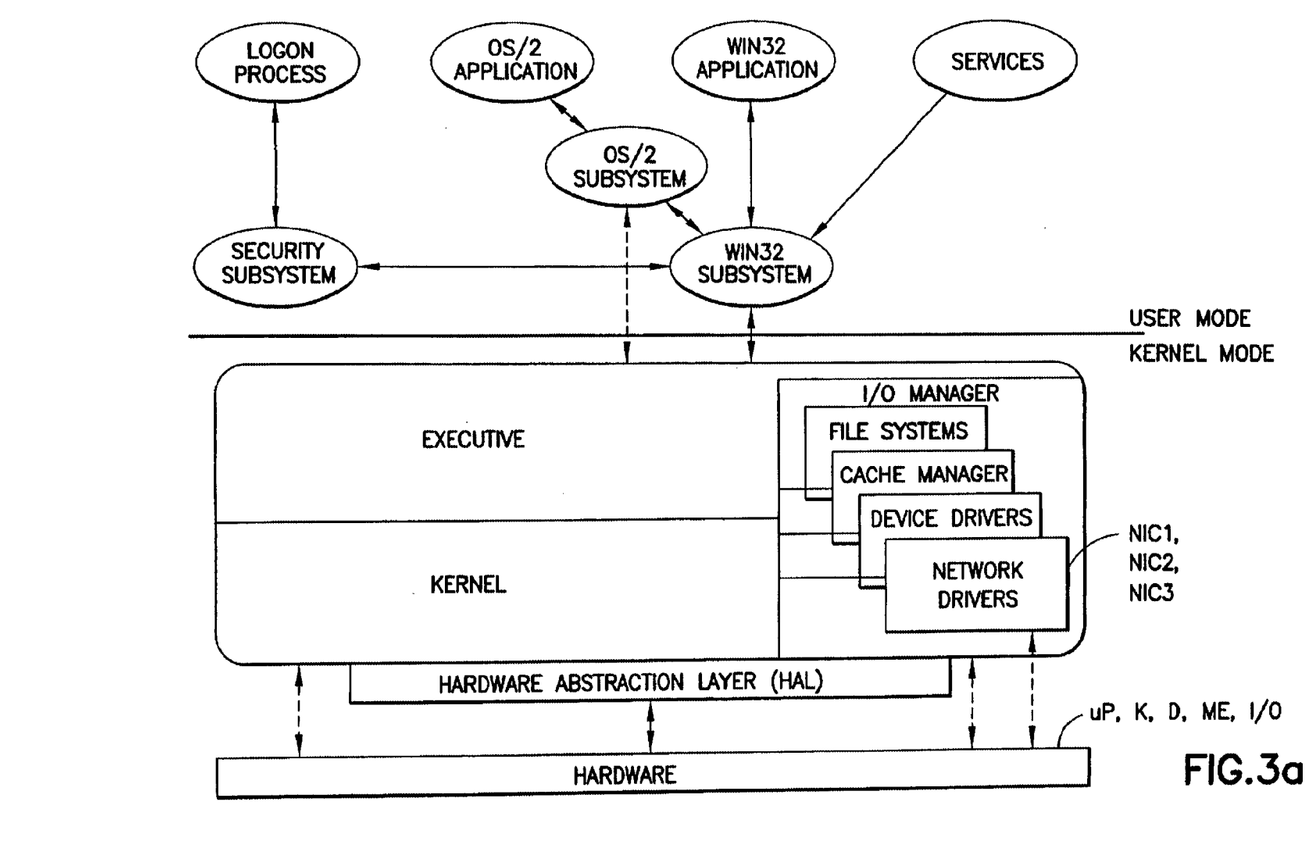
FIG. 3a shows the structure of an operating system in a reduced manner.
Figure 3B:
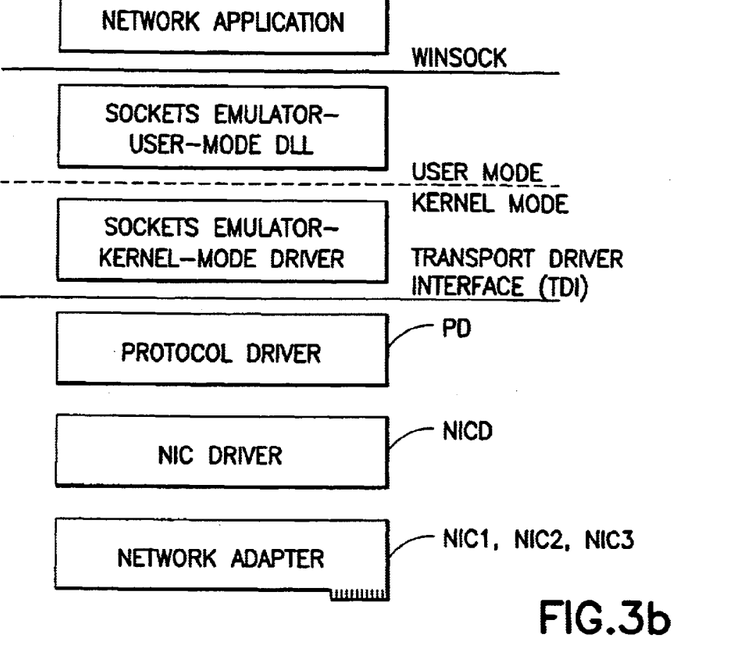
FIG. 3b shows the network architecture of an operating system in a reduced manner.

The appended FIG. 3a presents in a reduced manner the structure of the Windows NT operating system. The lowermost level contains the actual hardware part, which is controlled by means of operating system functions and drivers connected to the operating system. The hardware part includes, for instance, a microprocessor $\mu P$, memory means MEM, a connection logic I/O, a display device D, and a keyboard K. For controlling the drivers, the operating system contains an I/O manager, which conducts, for instance, the start-up of the drivers and attends to the communication between the drivers and the rest of the operating system or other applications. Particular operating system functions, and a large part of the driver functions are conducted in a so-called kernel mode. Part of the operating system functions and the application programs started by the user are set to operate in a so-called user mode. The applications operating in this user mode have more restricted operating possibilities; for example, part of the memory space and processor instructions are available solely in the kernel mode, which is art known as such by anyone skilled in the art. Hereinbelow, for the purpose of understanding the present invention, this description focuses primarily on the network interface architecture, i.e. the function of the network interface card, network interface drivers, operating system network interface functions and application programs. FIG. 3b presents as an example the network interface architecture of the Windows NT operating system in a reduced manner.

The network interface architecture comprises a network interface card NIC, by means of which the actual physical data transmission connection is established. The network interface card is, for example, an Ethernet network interface card or a PCMCIA type WLAN network interface card. The practical implementation of this network interface card depends for instance, on the type of network interface in question. For example, a network interface card intended for a wireless local area network comprises a radio modem, or the like, whereby it is possible to set up a wireless data transmission connection to the radio modem of the local area network. Correspondingly, when connecting to the GSM mobile communication network, the network interface card comprises either a data interface to the mobile station (e.g. Nokia Cellular Data Suite), through which the data transmission connection is set up, or the network interface card can also comprise a mobile station transceiver for setting up a connection to the mobile communication network (e.g. Nokia Cellular Card Phone). Thus, the network interface card constitutes said physical layer and can also contain features of the link layer.

The network interface card driver NICD attends, for instance, to controlling the network interface card NIC1, NIC2, NIC3 and transmitting data between the network interface card NIC1, NIC2, NIC3 and the protocol driver PD. The network interface card NIC1, NIC2, NIC3, and the network interface driver NICD constitute the layers of the lowermost level in the protocol stack.

The network interface card driver NICD communicates with the protocol driver PD. The protocol driver PD implements, in this advantageous embodiment, the network layer and the transport layer of the protocol stack. The protocol driver PD uses services of the network interface card driver NICD in data transmission. The protocol driver PD, for instance, forms the information to be transmitted into packets which correspond to the link layer used at a given time, and are transmitted by the protocol driver PD to the network interface card driver NICD.

The upper level interface of the protocol driver PD forms a so-called transport driver interface TDI. This is provided with emulator applications (e.g. sockets emulator), or the like, whereby for instance a telecommunication application, such as a Windows browser program (WEB browser), can communicate with the protocol driver PD.

Figure 3C:
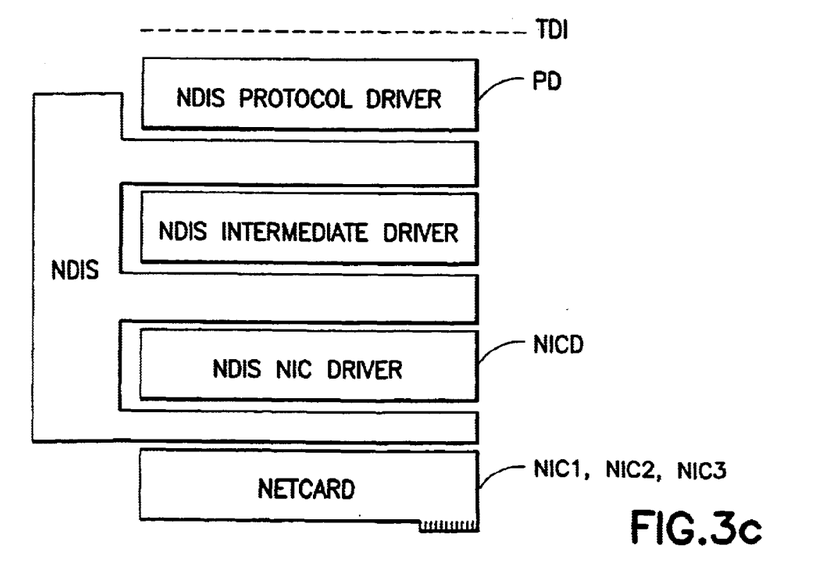
FIG. 3c shows the network controller interface of the network architecture according to FIG. 3b in a reduced manner.

For applying different data networks, network driver interface specifications NDIS are implemented in the Windows NT operating system, for the purpose providing the functional features common to the drivers of the data communication networks of different types. Thus, the hardware-specific and protocol-specific parts are implemented in the lower level network drivers. FIG. 3c presents an architecture according to such a network driver interface specification, which is located between the driver interface of the transport layer and the network interface card, and which is marked with NDIS in this description. This NDIS network interface architecture is advantageously composed of three kinds of drivers: NDIS protocol drivers, NDIS intermediate drivers and NDIS network interface card (NIC) drivers. The terminal contains typically a separate network interface card driver NICD for each network interface card, which communicates with the network interface card driver and the upper level drivers, wherein it is not necessary for the upper level drivers to know which data transmission network the terminal A is connected to at a given time. Hereinbelow, a shorter term NIC driver will be used for these network interface card drivers D1, D2, D3 and they will be marked with the references D1, D2, D3.

Figure 4:
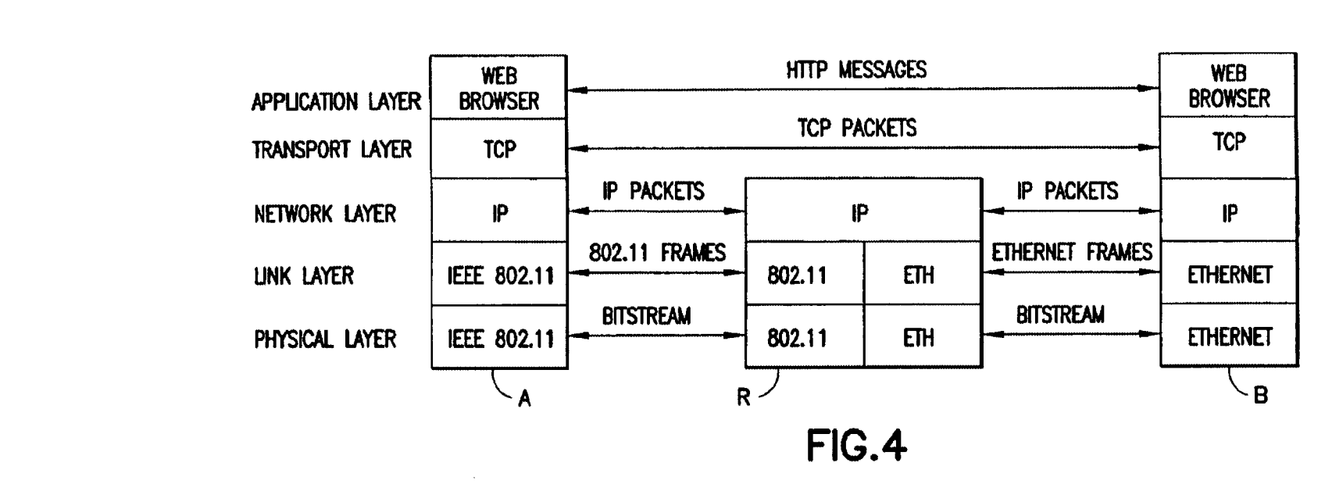
FIG. 4 shows the coupling of and data transmission between two terminals in different functional layers.

In the Internet data network, a TCP/IP protocol stack is generally used, which can be divided into five functional layers. These five layers are, listed from bottom to top: the physical layer (Layer 1), the link layer (Layer 2), the network layer (Layer 3), the transport layer (Layer 4), and the application layer (Layer 5). All the nodes of the Internet data network contain at least the first three layers. Of these nodes, routers, which are primarily responsible for the couplings of the data network, do not need the transport and application layers. However, hosts, between which the actual data transmission connection is set up, contain all the said five layers. The appended FIG. 4 presents by means of the TCP/IP protocol stack the coupling of and communication between two such hosts A, B via a router R. Even though all the upper level layers use the services of the underlying layer for data transmission, logically the corresponding layers of the hosts A, B communicate with each other by using the protocol typical for the layer. The arrows in the appended FIG. 4 illustrate this communication at the layer level.

The TCP/IP protocols can be used in a variety of network solutions, such as the packet switched Ethernet and in the Token ring network, or in a switched network, such as ATM and ISDN. In a connection according to FIG. 4, the data transmission between the first host A and the router R is conducted in a wireless manner. Data transmission between the router R and the second host B is conducted by means of a landline Ethernet network, but it is obvious that these network solutions only act as examples here. The Institute of Electrical and Electronics Engineers IEEE has developed a standard 802.11 for wireless local area networks. In the connection of FIG. 4, data transmission according to this standard 802.11 is used between the host device A and the router R.

In the following, the meaning of these different protocol stack layers will be described briefly. The actual data transmission is conducted in the physical layer by using a data transmission means, such as a wireless radio network or landline cabling.

The link layer attends to solutions required by different network technologies, wherein the upper level layers do not have to know how the data transmission network used at a given time is constructed. The link layer processes different addressing and frame modes and is responsible for the data transmission between two terminals in the same communication network.

The task of the network layer is to route packets between terminals in the communication network. The network layer provides the coupling between different data networks, wherein the upper level layers do not have to know about the structure of the data network. On this network layer level, for instance protocols IP (Internet Protocol), ICMP (Internet Control Message Protocol) and IGMP (Internet Group Management Protocol) are used.

The transport layer provides a generic end-to-end data transmission connection for the application layer. The application layer uses for instance a TCP protocol (Transmission Control Protocol) and a UDP protocol (User Datagram Protocol). In the example of FIG. 4, the terminals A, B communicate with each other in the transport layer by using packets according to the TCP protocol.

The application layer protocols operate above the transport layer and provide application-specific services, such as file transfer services or local area network remote login services. In the example of FIG. 4, the hosts A, B use a so-called HTTP protocol (HyperText Transfer Protocol) which is generally used in the Internet data network for loading and presenting the data contained in so-called home pages in the display device of a computer. For this purpose, in the example of FIG. 4, the first host A is running a so-called web browser program, which transmits a request to the Internet web server of the second host B. This Internet web server replies to the request by sending the contents of the requested home page in HTTP messages. This home page is composed, for example, by means of hypertext mark-up language HTML. Other application layer protocols include Telnet, the file transfer protocol FTP and the simple mail transfer protocol SMTP.

In the Internet data network, each terminal or host has its own identifying IP address. The IP address is in the Internet protocol version IPv4 a 32 bit, i.e. 4 byte number which is split into an organization-specific network address and a network-specific device address. In a newer Internet protocol version IPv6, the length of the address fields is increased to 128 bits, which, in practice, means that it is possible to allocate an individual address for all the devices which are connected to the Internet data network. An Internet host connected to the Internet data network via a local area network LAN, WLAN has either a permanently specified Internet address or the address is a dynamic address established by the local area network server (for example by using dynamic host configuration protocol DHCP). If the Internet host is connected to a telecommunication network via a modem, the host has to request for an Internet address from the Internet service provider, to which the Internet host is registered. This is conducted, for example, according to a point-to-point protocol PPP. In both cases, the data is routed in the Internet to the Internet host from a remote terminal, possibly via several communication networks and routers by using the specified Internet address.

The Internet protocol IP specifies the data transmission in packets ("Datagrams"). When a host or a router receives a packet on the IP level, either from the data network or from an upper level of the protocol stack, the first step is to examine whether the packet is intended precisely for the router or terminal in question. If the packet is intended precisely for this router or terminal, the packet is transferred from the network layer to the upper layer in this node. If the packet is intended to another node, a so-called routing algorithm is executed in the network layer for concluding how the packet should be processed. First, it is examined whether the packet is intended for another node in the same network. If this is the case, the node can transmit the packet to the destination address by using the mechanisms of the link layer. Thus, the IP address of the network layer level is connected to the corresponding link layer address by using the so-called address resolution protocol ARP, which will be described below in this description. In this node, the packet is also framed into a packet corresponding to the link layer and transmitted further.

If the packet is intended for another network, the routing algorithm runs through a routing table in order to find out to which address the packet should be transmitted. The routing table typically contains a so-called default address, to which all such packets are transmitted whose routing address cannot be found in the routing table.

The situation of FIG. 4 can be used as an example of the above described routing, in which the first host A and the second host B communicate with each other via the router R. In the situation where the first host A has a packet to transmit to the second host B, the routing algorithm detects that the destination address of the packet is not located in the same network as the first host A. Thus, the routing algorithm starts running through the routing table and finds the data of the correct router R. Thus, the first host A transmits the packet to the router by using, for example, data transmission according to the IEEE 802.11 standard. The router R receives the frame, unpacks its content and examines from it the header according to the network layer packet. The router is located in the same network as the second host B, wherein the router R can transmit the packet directly to the second host B by using Ethernet data transmission.

The transmission of IP packets between different coupled data networks on the network layer level is conducted on the basis of IP addresses. In addition to the IP addresses, the devices connected to the Internet data network also have a so-called link layer address, which is also called a device address. Because terminals use link layer services in packet transmission with terminals connected to the same data network, the terminals need the address resolution protocol ARP for connecting the IP addresses to the corresponding link layer addresses. The reverse address resolution protocol RARP connects the link layer addresses to the corresponding IP addresses. The function of the address resolution protocol ARP depends on the structure of the data transmission connection used at a given time. For example, the serial line Internet protocol SLIP intended for series connection, and the point-to-point protocol PPP do not require the address resolution protocol ARP at all, because the series connection only contains two well known end points.

Figure 5:
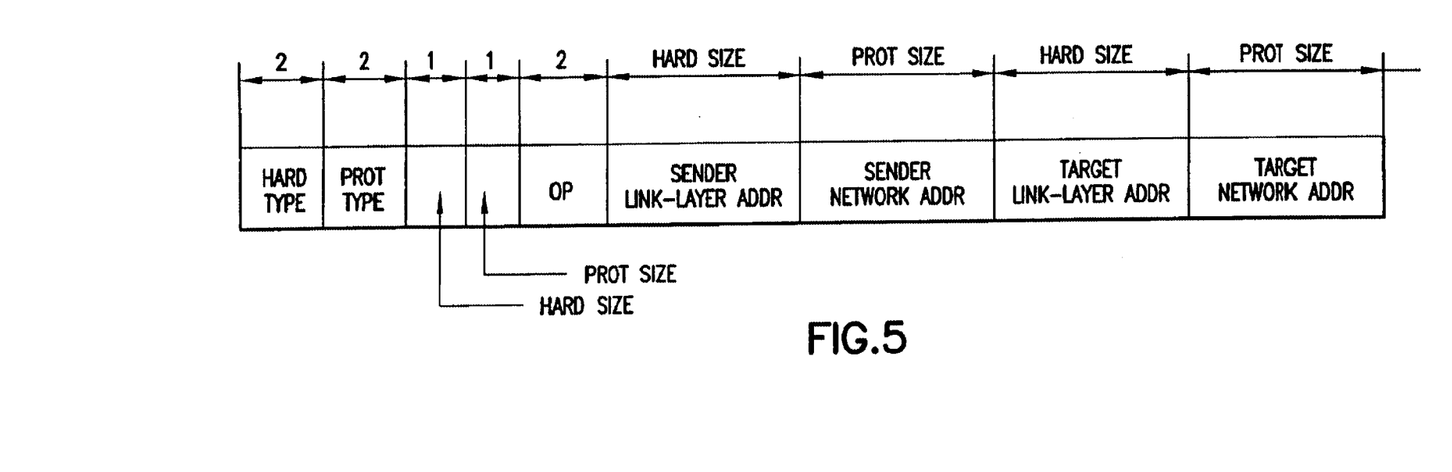
FIG. 5 shows an advantageous example of the message structure of the address resolution protocol ARP.

In such link layer level protocols which make a simultaneous connection possible between several different terminals, i.e. so-called "Broadcast" connections, such as the Ethernet, the address resolution program typically uses four different messages: an ARP request, an ARP reply, an RARP request, and an RARP reply. FIG. 5 presents the strucure of one such message. The first field, hard type, specifies the addressing mode of the application layer level. The next field, prot type, identifies the type of the network layer level, wherein the address resolution protocol can be used also in network layer level protocols other than IP. A hard size field specifies the length of the link layer address field in the frame, and a prot size field specifies the length of the network layer level address field in the frame. The OP field specifies the type of the message: an ARP request, an ARP reply, an RARP request, or an RARP reply. After this, the frame contains the link layer address field of the sender, the link layer address field of the receiver and the network layer address field of the receiver.

A terminal can define the physical, i.e. link layer address of another terminal by transmitting an ARP request message, in which the transmitting terminal has filled all the other address fields except the link layer address field of the receiver. At the stage when the receiving terminal notices that its link layer address is asked for, it replies by transmitting to the source terminal an ARP reply message, in which the address of this link layer is transmitted to the inquiring terminal.

The terminals maintain a so-called ARP table (ARP cache) which contains the network layer address (IP address) and the corresponding link layer address of those terminals from which the terminal in question has determined this correspondence between addresses. The terminal updates this ARP table at the stage when it receives an ARP reply message to the ARP query message, or in the situation when the terminal receives an ARP query message transmitted by another terminal, in which the terminal transmitting the message has located its own network layer address and its corresponding link layer address.

In the IP protocol used by the Internet data network, a so-called mobile IP protocol has been developed to allow the mobility of the terminal. This mobile IP protocol makes it possible for the terminal to move from one location to another in the Internet data network, maintaining, however, the same IP address. This mobility is implemented in the network layer level, wherein the change of location does not affect the applications and the applications can still function even though the location changes. This mobility is possible by using a so-called home agent, which is located in the home network of a mobile Internet terminal, and which conducts re-routing of the messages transmitted to the mobile terminal to the Internet data network in which the mobile terminal is located at a given time. When using solutions currently known, however, the mobility requires that the connection is maintained by means of a data network of a similar type, for example by using a GSM mobile communication network, if its undesirable to terminate the connection.

Figure 6:
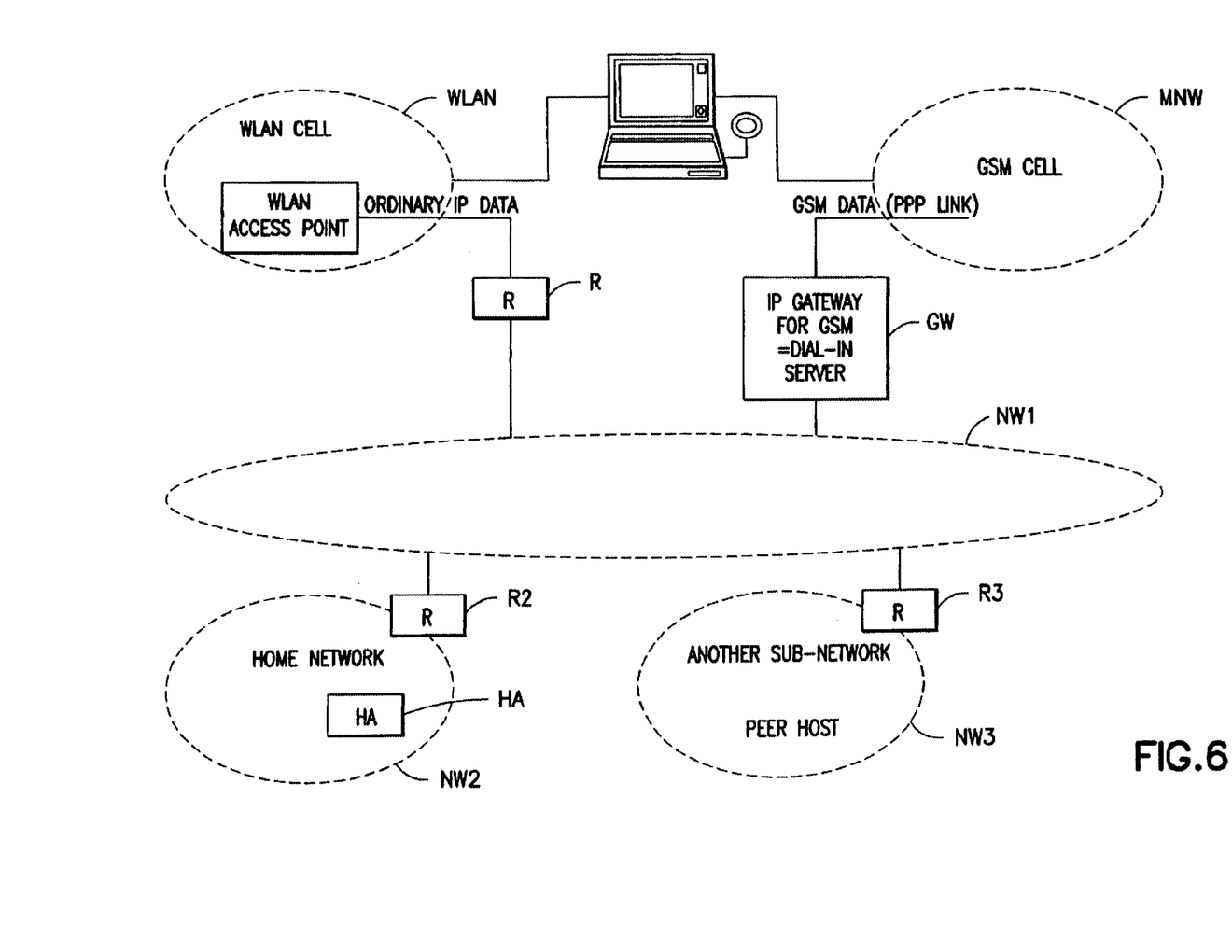
FIG. 6 shows the network architecture of a system, in which it is advantageous to apply the invention.

The appended FIG. 6 presents the network architecture of a system in which it is advantageous to apply the invention. A terminal A according to the invention can be connected for example to a wireless local area network WLAN or to a GSM mobile communication network MNW. The wireless local area network WLAN can consist of one or more cells, wherein each cell contains a WLAN access point 3, via which the terminal A can communicate with the local area network WLAN. In the system of FIG. 6, the WLAN access point 3 is in data transmission connection via a router R to an IP data network NW1, such as the Internet data network. There are also other data networks NW2, NW3 connected to this IP data network NW1 via routers R2, R3. In the system of FIG. 6, a connection is set up also from the GSM mobile communication network MNW to the IP data network via a gateway GW, which is known as such. Thus, with the terminal A, a data transmission connection can be set up also via the GSM mobile communication network MNW to the IP data network NW1.

In the system of FIG. 6, it is presumed that the so-called home network of the terminal A is a second data network NW2, in which a home agent HA is responsible for the mobility management of the terminal when the terminal A is not connected to the home network NW2. Each data network may further contain foreign agents, through which it is possible to connect the terminal A to communicate in a data network other than the home network.

Figure 7:
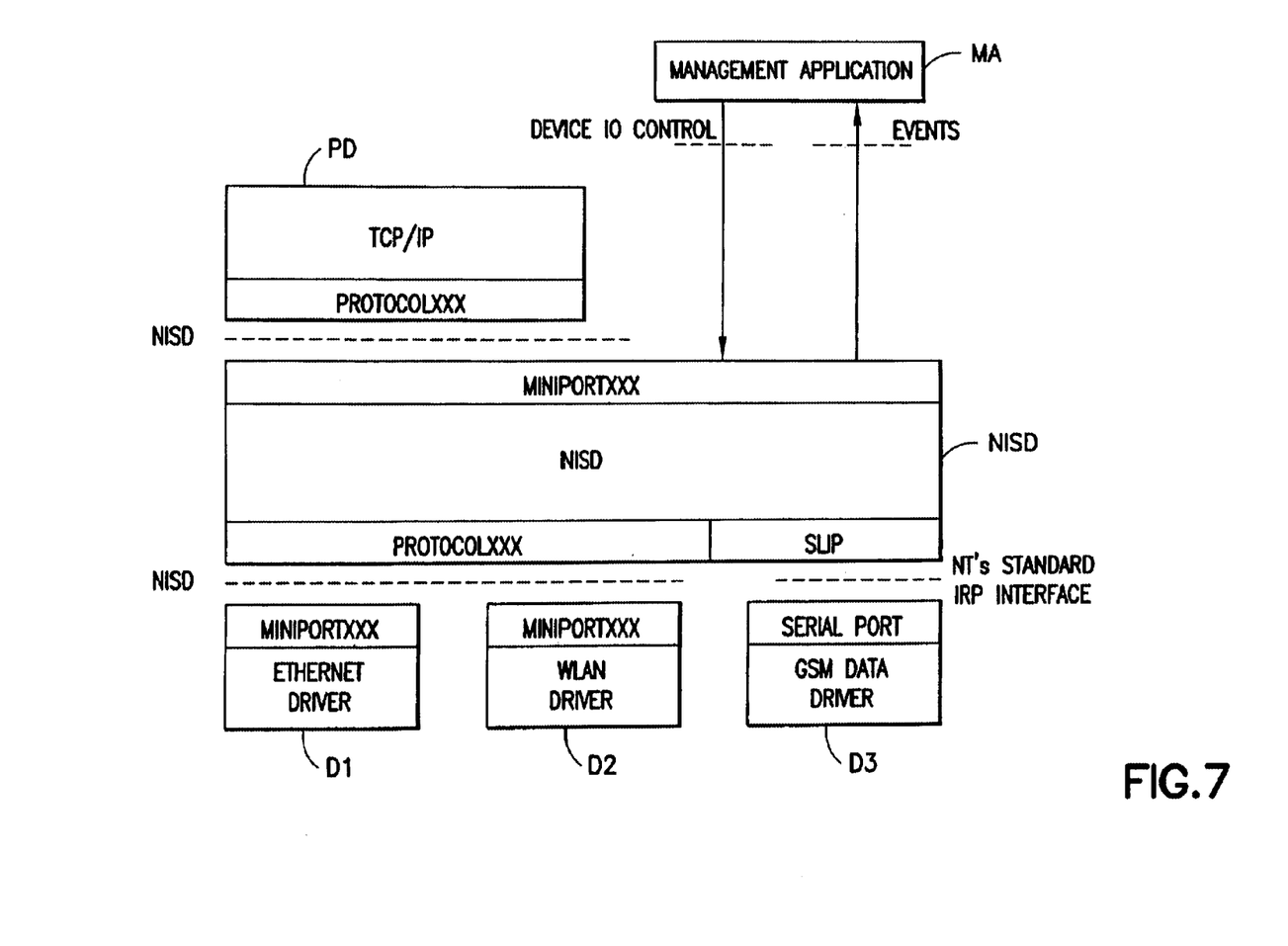
FIG. 7 shows the functionality of a terminal according to an advantageous embodiment of the invention in a reduced manner.

FIG. 7 presents in a reduced manner the functionality of the terminal A according to an advantageous embodiment of the invention. The terminal A comprises an Ethernet NIC driver D1, a wireless local area network NIC driver D2 and an NIC driver D3 for connecting to the mobile communication network MNW for data transmission. These NIC drivers D1, D2, D3 are device drivers known as such, and they comprise an interface for connecting to the operating system. These NIC drivers D1, D2, D3 are usually supplied with the corresponding network interface card NIC. The terminal A according to the invention is supplemented with a network interface selection driver NISD, in which corresponding interfaces are established for connecting to the NIC drivers D1, D2, D3. The network interface selection driver NISD comprises an upper level interface, by means of which it can be connected to the protocol driver PD for transmitting information between the protocol driver PD and the network interface selection driver NISD. This interface is an interface known as such. The network interface selection driver NISD is established between the protocol driver PD of prior art and the NIC drivers D1, D2, D3 without changes being required in these existing layers. The protocol driver PD is, for example, a TCP/IP type driver implementing the TCP/IP protocol stack, which is implemented for instance in the Windows NT operating system software. Data transmission between the protocol driver PD and the network interface selection driver NISD is conducted preferably by using always the same protocol, irrespectively of the type of the data network to which the terminal A is connected at a given time. The network interface selection driver NISD attends to the protocol and address modifications required between the protocol driver PD and the NIC drivers D1, D2, D3. The diagram of FIG. 7 also shows a management application MA for the network interface selection driver, for controlling e.g. the function of the network interface selection driver NISD and the selection of the NIC driver D1, D2, D3 corresponding to the network interface used at a given time.

In the following, the function of a terminal A according to an advantageous embodiment of the invention will be described with an example. When the terminal A is set to work, the operating system loads the NIC drivers D1, D2, D3, the intermediate drivers and the protocol drivers in the terminal memory MEM. By means of system settings, it is possible to control the loading order and the drivers to be loaded. An I/O manager in the operating system also starts the operation of the network interface selection driver NISD. The network interface selection driver NISD determines from the started NIC drivers D1, D2, D3, for instance their features and the connection state of each NIC driver, in other words whether the network interface card corresponding to the NIC driver D1, D2, D3 is connected to the data transmission network. Before starting the management application MA of the network interface selection driver, the network interface selection driver NISD transmits to the protocol driver PD the information that the terminal A is not yet connected to any data network.

After it is started, the management application MA of the network interface selection driver examines which NIC drivers D1, D2, D3 are started in the terminal A and what is the quality of each active connection. It is also possible that a network interface card has received from the corresponding data network an advertisement message from an agent, such as an home agent or a foreign agent, by means of which the agent aims at defining the address information of the terminals A connected to the data network. On the basis of the defined information, the management application MA of the network interface selection driver directs the network interface selection driver NISD to transmit, when necessary, a registration message to that data network NW1, NW2, NW3, MNW, to which the network interface selection driver management application MA or the user of the terminal A desires to be connected at that moment. At this stage, the network interface selection driver NISD indicates to the protocol driver PD that the coupling to the data network is activated, wherein the network interface selection driver NISD can start transmitting packets.

Figure 8A:
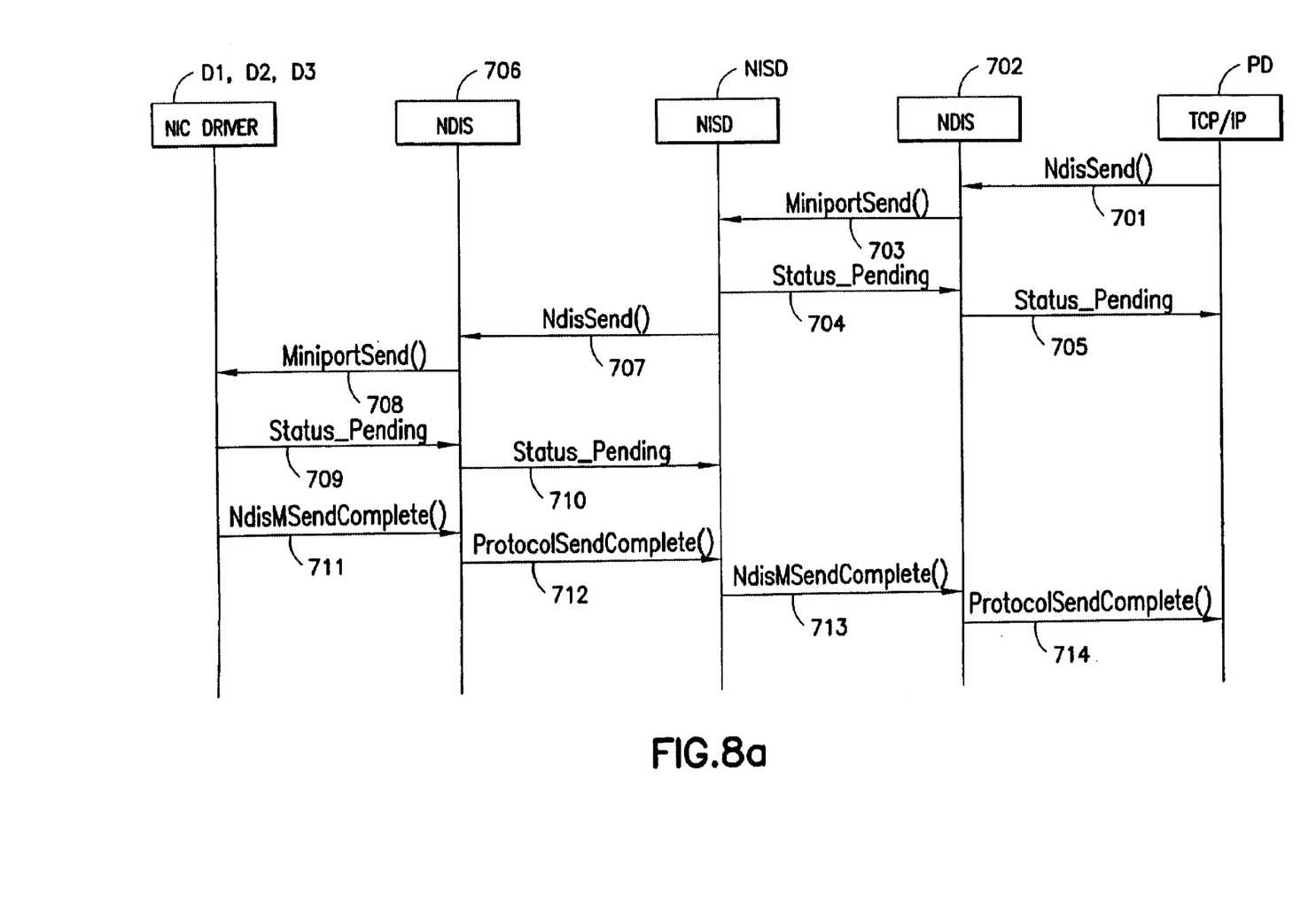
FIG. 8a is an arrow diagram showing data transmission in a terminal according to an advantageous embodiment of the invention.

FIG. 8a presents, in an arrow diagram, data transmission from the terminal A to the activated data network NW1, NW2, NW3, MNW. From the data to be transmitted, which is for example a message composed by a browser application, for example packets according to the IP protocol are formed in the protocol driver PD. These packets are transferred to the network interface selection driver NISD (arrow 701) via an upper level NDIS interface 702, which in practical applications can be implemented for example as a function call to a subprogram within the network interface selection driver NISD, which is obvious for anyone skilled in the art. This is shown by the arrow 703 in FIG. 8a. The network interface selection driver NISD returns state information STATUS_PENDING to the protocol driver PD (arrows 704, 705), on the basis of which the protocol driver PD knows that the message is waiting for transmission. The network interface selection driver NISD forms the packet into a packet according to the data network which is active at that moment and to which the packet is transmitted. The network interface selection driver NISD transmits the packet it has formed via lower level NDIS interface 706 to the NIC driver D1, D2, D3 of the active data network (arrows 707, 708). After receiving the packet, the NIC driver D1, D2, D3 transmits state information STATUS_PENDING to the network interface selection driver NISD (arrows 709, 710) and transmits the packet to the network interface card, in which the actual data transmission to the data network is conducted in a way known as such. After the packet has been transmitted to the data network, the NIC driver D1, D2, D3 transmits state information READY to the network interface selection driver NISD (arrows 711, 712), from which the state information is transmitted further to the protocol driver PD (arrows 713, 714). The aforementioned packet transfer between the protocol driver PD, the network interface selection driver NISD and the NIC driver D1, D2, D3 does not necessarily require copying the contents of the packet always to a new location in the terminal memory MEM, but for example a memory address in which the packet is located can be transmitted.

Figure 8B:
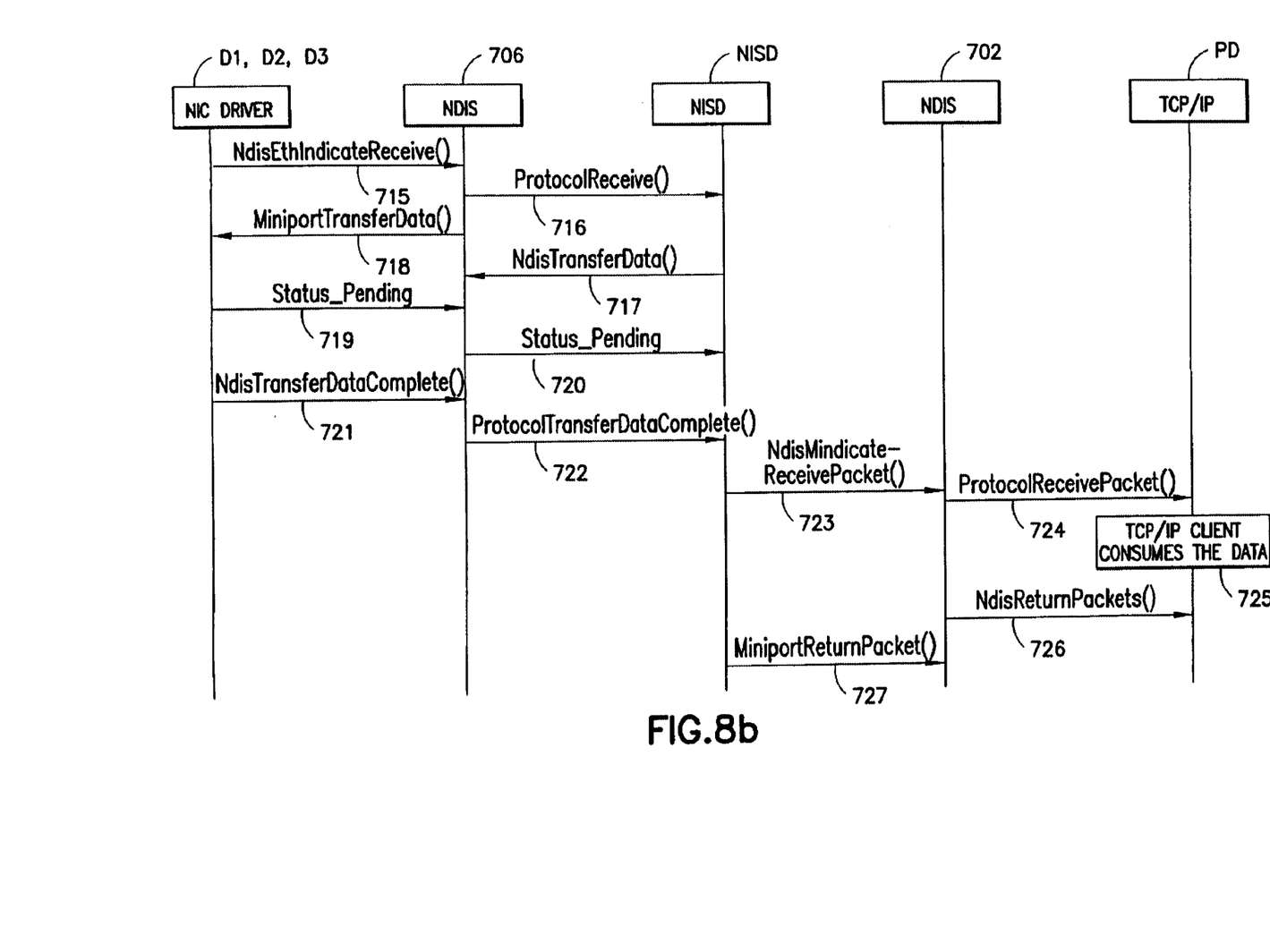
FIG. 8b is an arrrow diagram showing data reception in a terminal according to an advantageous embodiment of the invention.

FIG. 8b, correspondingly, presents packet reception from the data network. After the network interface card of the active data network has received the packet and transmitted it to the corresponding NIC driver D1, D2, D3, the NIC driver D1, D2, D3 transmits information on the received packet via the lower level NDIS interface 706 to the network interface selection driver NISD (arrows 715, 716). In the network interface selection driver NISD, a function call or the like is conducted, whereby the NIC driver D1, D2, D3 which has received the packet is directed to transfer the packet to the network interface selection driver NISD (arrows 717, 718). The NIC driver D1, D2, D3 can, at this stage, transmit state information STATUS_PENDING to the network interface selection driver NISD (arrows 719, 720) in order to report that transmission is being started. During the transmission, the network interface selection driver NISD can conduct other functions if necessary. When the packet transmission is finished, the NIC driver D1, D2, D3 reports this to the network interface selection driver NISD (arrows 721, 722), after which the network interface selection driver NISD can examine the contents of the packet and decide what procedures the packet entails. In the example of FIG. 8b, the network interface selection driver NISD transmits the packet to the protocol driver PD (arrows 723, 724), in which the processing of the data of the packet is conducted in a way known as such. This processing is illustrated in block 725 of FIG. 8b. After this, the protocol driver PD also indicates (arrows 726, 727) that it has processed the packet and is ready to receive a new packet.

The protocol driver PD of the terminal A is not aware that there are more than one network interface cards available in the terminal A. Thus, the protocol driver PD uses the same address information irrespective of the data network to which information is being transmitted at a given time. Therefore, an address resolution protocol ARP is established in the network interface selection driver NISD, by means of which the address modifications are conducted when necessary. In the following, this will be illustrated with some examples.

In a first situation, it is presumed that the user uses the terminal A somewhere else than in the home network NW2 of the terminal A, and that the terminal A does not use said foreign agents in the data transmission. The address resolution protocol is implemented in the network interface selection driver NISD. The protocol driver PD implemented in the operating system can, however, transmit ARP message which are not being transmitted from the terminal A forward but to which the network interface selection driver NISD replies with random information.

The address resolution protocol of the network interface selection driver NISD examines the link layer addresses of those terminals, which are coupled to the same data network with the terminal A at that moment. This can be implemented by sending from the terminal A ARP query messages, to which other terminals reply. These ARP messages have been briefly described above in this description. After receiving an ARP reply message, the address resolution protocol can update the ARP table in which the correspondence between the link layer address of the terminal and the corresponding network layer address becomes evident. The terminal A can also receive ARP query messages, in which another terminal inquires the address of this terminal A in this data network. For example, the term care-of-address can be used for this address.

In another situation, the user uses the terminal A somewhere else than in the home network NW2 of the terminal A and the terminal A uses said foreign agents in the data transmission. Thus, the network interface selection driver NISD does not have to conduct the address resolution protocol, because it receives the link layer address of the foreign agent in the advertisement messages transmitted by the foreign agent and received by the terminal A. Also in this case, the network interface selection driver NISD replies with random information to the ARP messages transmitted by the protocol driver PD.

In a situation where the user uses the terminal A in the home network NW2, the terminal A could use the address resolution protocol of the protocol driver PD. This, however, causes problems in solutions of prior art when the terminal A is transferred to use another data network, because, for instance, in the address resolution protocol of the protocol driver PD of Windows NT, this possibility to change the data network is not taken into account. Thus, the protocol driver PD would continue to transmit packets to an address according to the link layer of a terminal in the home network NW2. This, however, does not mean the same terminal in that data network, which the terminal A has entered, and packet transmission is not successful. In this method and terminal A according to an advantageous embodiment of the invention, the address resolution protocol established in the network interface selection driver NISD as well as its own ARP table are used also when the terminal A is connected to the home network. In the packets which are being transmitted, the network interface selection driver NISD changes the destination address set by the protocol driver PD into a link layer address which can be accessed from the ARP table on the basis of network layer address information. The network interface selection driver NISD can also reply, for example with random messages, to inquiries possibly transmitted by the address resolution protocol of the protocol driver PD.

Figure 8C:
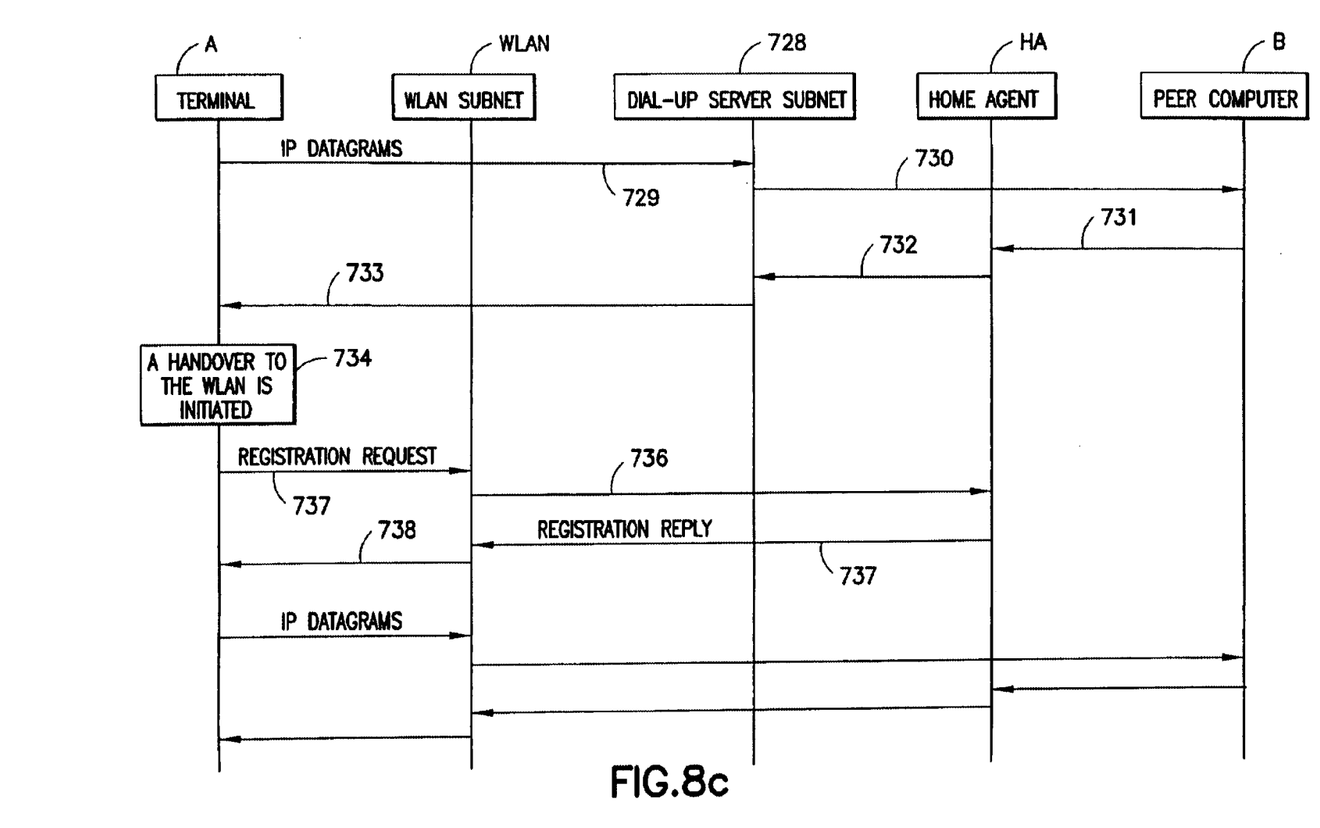
FIG. 8c is an arrow diagram showing the change of a data transmission network in a terminal according to an advantageous embodiment of the invention.

Next, we shall discuss a situation where the terminal A shifts an active connection from one data network to another. The reason for the connection transition can be that the terminal A is transferred outside the service area of an active data network, or for another reason the connection quality in the active data network deteriorates at that moment to such an extent that the network interface selection driver NISD starts to change the connection to another data network. A reason for the connection change can also be that the terminal A enters the operation range of such a data network which the user has given a higher priority than the data network active at the moment. The terminal A is, for example, connected to a GSM mobile communication network and the user of the terminal arrives in an office where a wireless local area netwok is available. The appended FIG. 8c shows this data transmission network change in a reduced arrow diagram. It is presumed that the terminal A is connected to a second terminal B via a GSM mobile communication network. The connection is for example a TCP connection. The terminal A transmits IP packets to the second terminal B directly, without tunneling, via a server 728 located in the GSM mobile communication network. This is illustrated with arrows 729 and 730. The second terminal B transmits IP packets to the first terminal A via the home agent HA of the first terminal (arrow 731), from which the packets are transmitted via the server 728 to the first terminal A (arrows 732 and 733). In the first terminal A, the network interface selection driver NISD chooses to shift the connection to another data network, in this example to the wireless local area network WLAN (block 734). The first terminal A transmits a registration request message to the home agent HA via the wireless local area network WLAN (arrows 735 and 736) and at the same time continues to transmit IP packets via the GSM mobile communication network, if there are packets to be transmitted and the connection quality is adequate. The home agent HA receives the registration request, updates the new location address of the first terminal A in its own database and transmits a registration reply message via the wireless local area network WLAN to the first terminal A (arrows 737, 738). After this, the home agent HA transmits the packets addressed to the first terminal A to the wireless local area network WLAN, instead of the GSM mobile communication network. After receiving the registration reply message, the first terminal A terminates the connection to the GSM mobile communication network and starts to transmit packets by using the wireless local area network. In the above described method according to an advantageous embodiment of the invention, it is not necessary for the second terminal B and its applications to know the data network and address used by the first terminal A in this data network at a given time. The applications of the second terminal B can still transmit by using the same IP address of the first terminal.

As a summary on the function of the network interface selection driver NISD, it is mentioned that its purpose is to route the TCP/IP packets from the protocol driver PD to the NIC driver D1, D2, D3, which the management application MA of the network interface selector driver has selected to be active, and correspondingly to transmit the packets received by the NIC driver D1, D2, D3 to the protocol driver PD and to make the necessary modifications in for the packets being transmitted and received. In addition, the network interface selection driver NISD comprises IP protocol mobility management functions (mobile IP), such as tunneling of packets, transmission and reception of registration messages, transmission and reception of foreign agent resolution messages and reception of advertisement messages transmitted by foreign agents.

With the management application MA of the network interface selection driver, the user can control the functional alignments of the network interfaces of the terminal A, such as quality parameters, on the basis of which the management application MA of the network interface selection driver examines, for instance, whether the quality of the connection is adequate in the data network used at that moment, or should a connection to another data network available be attempted. The user can also determine the priority among data networks, wherein the data network with the highest priority is advantageously selected from the data networks with adequate connection quality. The management application MA of the network interface selection driver is also responsible for directing the connection set-up and cut off to the mobile communication network MNW when necessary.

The invention is not restricted solely to the embodiments presented above, but it can be modified within the scope of the appended claims.

What is claimed is:

1. A terminal (A) comprising: at least one network interface card (NIC1, NIC2, NIC3) for setting up a data transmission connection to a communication network (NW1, NW2, NW3, MNW) for packet switched data transmission, and protocol-driver means (PD) for forming packets of information to be transmitted and for unpacking information from received packets, wherein the terminal (A) is allocated at least one first address identifying the terminal (A) and at least one data network-specific second address, the protocol-driver means (PD) comprising connecting means for connecting the first address to the packets, and the terminal (A) also comprises a network interface selection driver (NISD) to enable the terminal to communicate selectively via any one of a plurality of communication networks, which contains selecting means for selecting the communication network (NW1, NW2, NW3, MNW) to be used in data transmission, transmitting means for transmitting packets between the protocol-driver means (PD) and the network interface card (NIC1, NIC2, NIC3) corresponding to the data transmission network (NW1, NW2, NW3, MNW) selected by the selecting means, and modifying means for modifying the first address according to the data transmission network being used in the packets.

2. The terminal (A) according to claim 1, wherein the network interface selection driver (NISD) is established between the protocol-driver means (PD) for forming packets and the network interface card (NIC1, NIC2, NIC3) without making modifications to the protocol-driver means (PD) and to the network interface card (NIC1, NIC2, NIC3).

3. The terminal (A) according to claim 1, wherein the network interface selection driver (NISD) operates by means of an address resolution protocol (ARP) for modifying the first address according to the data network used in the packets at a given time.

4. The terminal (A) according to claim 1, wherein the first address is modified without terminating the data transmission connection.

5. The terminal (A) according to claim 1, further comprising means (NISD, D1, D2, D3, NIC1, NIC2, NIC3) for changing the communication network (NW1, NW2, NW3, MNW) used in the data transmission connection without terminating the data transmission connection.

6. The terminal (A) according to claim 1, further comprising means (D1, D2, D3) for controlling the network interface cards (NIC1, NIC2, NIC3).

7. The terminal (A) according to claim 1, wherein the network interface selection driver (NISD) comprises IP protocol mobility management functions (Mobile IP), including at least a plurality of packet tunneling, transmission and reception of registration messages, transmission of foreign agent resolution messages and reception of advertisement messages transmitted by foreign agents.

8. A method in a packet switched data transmission between a terminal (A) and a communication network (NW1, NW2, NW3, MNW), in which method a data transmission connection to the data transmission network (NW1, NW2, NW3, MNW) is set up with a network interface card (NIC1, NIC2, NIC3) of the terminal (A) to enable the terminal to communicate selectively via any one of a plurality of communication networks, and packets are formed of information to be transmitted, and information transmitted in received packets is unpacked, wherein, in the method:

the terminal (A) is allocated at least one address identifying the terminal (A) and at least one data network-specific second address, the first address is connected to the packets, and the first address is modified according to a data transmission network being used in the packets, the data transmission network to be used is selected, wherein packets are transmitted via a network interface card (NIC1, NIC2, NIC3) corresponding to the selected data transmission network (NW1, NW2, NW3, MNW).

9. The method according to claim 8, further comprising a step of employing the address resolution protocol (ARP) in order to modify the first address according to the data transmission network being used in the packets.

10. The method according to claim 8, further comprising a step of allocating to the terminal one data transmission network (NW1, NW2, NW3, MNW) as a home network for said terminal (A), and said home network is provided with a home agent (HA) for directing packets addressed to the terminal (A) to the data network used by said terminal (A) in a data transmission connection.

11. The method according to claim 10, wherein, in order to change the data transmission connection from said data network to another data network, a first message is transmitted from the terminal (A) to the home agent (HA), which transmits an acknowledgement message of the change of the data network to the terminal (A), and wherein there is a further step of storing information on the data network used in the data transmission connection in the home agent (HA).

12. The method according to claim 8, further comprising a step of monitoring the quality of the data transmission connection, and if the quality deteriorates below a specified limit, there is a step of examining whether a better connection quality can be achieved with another data transmission network available, wherein the data transmission connection is changed to such a data transmission network with which a better connection quality is achieved.

* * * * *